Dec. 29, 1964     W. S. BUZZARD     3,163,172
CONSISTENCY MEASURING AND CONTROL METHOD AND APPARATUS
Filed Feb. 1, 1962
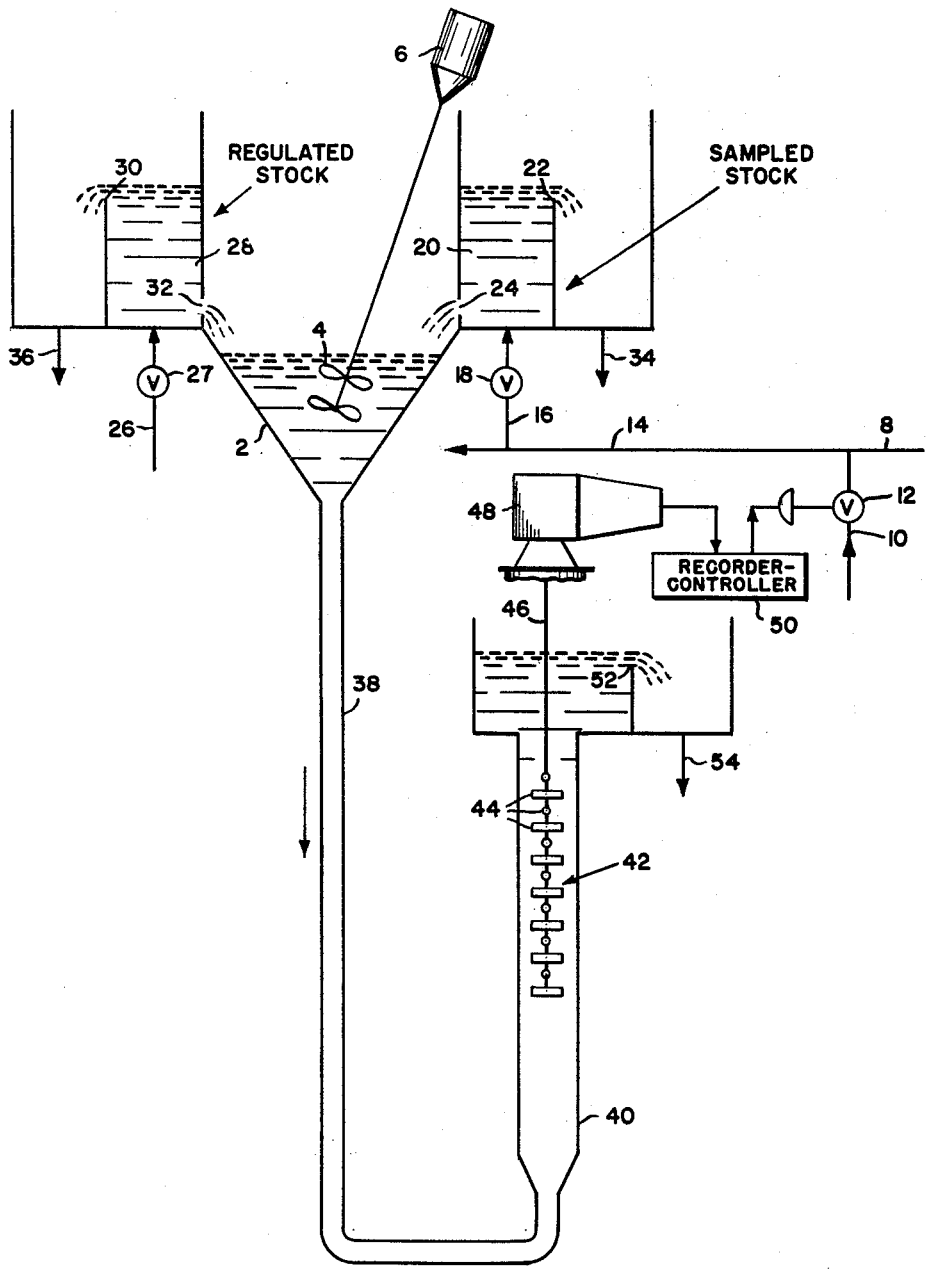
INVENTOR.
WILLIAM S. BUZZARD
BY
ATTORNEYS

United States Patent Office 3,163,172
Patented Dec. 29, 1964

3,163,172
CONSISTENCY MEASURING AND CONTROL
METHOD AND APPARATUS
William S. Buzzard, Jenkintown, Pa., assignor to Fischer
& Porter Company, Warminster, Pa., a corporation of
Pennsylvania
Filed Feb. 1, 1962, Ser. No. 170,466
7 Claims. (Cl. 137—4)

This invention relates to measuring and control of consistency of slurries such as paper stock, and has particular reference to the measurement and control of paper or similar stock containing a low concentration of solids. The term "consistency" is herein used in its conventional sense in the paper making art, being the percentage of insoluble solids by weight in a suspension or slurry.

In the application of Victor P. Head, Serial No. 713,406, filed February 5, 1958, now Patent 3,027,756, there is disclosed a type of device for measuring and regulating the consistency of a suspension constituting what may be referred to as a non-viscous plastic, by which is meant a material in which the increase of shear stress with shear rate is a negligible fraction of the yield stress value. Such a suspension is typified by a slurry of fibrous vegetable material suspended in water containing a negligible amount of dissolved solids, "negligible" being used from the standpoint of affecting viscosity, in the usual sense, of the aqueous carrier. Paper stock and unsweetened food pulps fall in this category. In such instances the value of the yield stress represents, substantially, the upper limit of the stress possible in the slurry, and any attempt to increase the stress merely results in increase of velocity of flow, without substantial increase of stress. The yield stress is then essentially a measure of consistency, the measurement being substantially insensitive to changes of temperature, freeness of the slurry, and large variations in flow rates. For the determination of the yield stress the indicated apparatus comprises a float consisting of a rod from which fingers project laterally to effect shearing of the suspension, the float exerting a force on a transmitter which provides an output, for example, pneumatic, to serve for measurement or control.

Since the major commercial application of the device is to the measurement and control of paper stock, the present invention will be described with particular reference thereto. The device referred to is highly satisfactory for measurements of consistency of paper stock when the consistency is upwards of about 1%, and has then good linearity and accuracy, giving results to within 0.1% of consistency. But when the consistency is lower, the output of the device departs substantially from linearity and the accuracy becomes unsatisfactory. As a practical matter it is often necessary to handle stock having consistency of the order of 0.5%, thinning to this extent being necessary, for example, to effect cleaning of the stock by screening. This stock is thereafter concentrated, but measurement and control of the thin, low consistency stock is desirable.

The general object of the present invention is the provision of a method and apparatus for reliable measurement of consistency in a low range. In accordance with the present invention, the low consistency stock is mixed with a definite proportion of stock of the same type but of higher consistency, and the mixed stock with its consistency thus raised has its yield stress measured by the foregoing apparatus. Computation, which may be effected by the use of tables, will then give the consistency of the thin sample. Or, additionally or alternatively, the measurement of the yield stress may be used directly to control the consistency of the sample by dilution with added water.

It may seem, on first consideration, that the procedure just outlined would result in deterioration of accuracy of the measurement of the low consistency of the sample; but, actually, the measuremernt of consistency is so greatly improved at the level of the higher consistency mixture that there is a great improvement in measurement of consistency of the sample, though indirect, as compared with the accuracy attainable by direct measurement of the sample.

The foregoing general object as well as others relating to details of apparatus construction and operation will become apparent from the following description, read in conjunction with the accompanying drawing, in which the figure shows diagrammatically a preferred form of apparatus provided in accordance with the invention.

The apparatus comprises a funnel-like receptacle 2 in which admixture of a sample of the slurry to be measured and a more highly concentrated similar stock is effected. The admixture is made uniform by provision of a stirrer 4 operated by a motor 6. At this point it may be remarked that the admixture should be of two slurries containing two solids of the same type, since the calibration of the apparatus is empirical with respect to the type of stock involved, different stocks requiring different translation of the yield stress to consistency. The yield stress, as will be readily apparent, depends on the size and nature of the fibers in suspension.

The apparatus disclosed involves control, in addition to measurement, of the stock, and consequently the stock introduced at 8 may be assumed to be thin but of higher consistency than is desired for some treatment such as screening. Accordingly, water is introduced at 10 through a control valve 12 to produce in the delivery line 14 a stock of somewhat lower consistency than is introduced. A sample of the flow through line 14 is delivered through connection 16 containing an adjustable valve 18 to a reservoir 20 having an overflow weir at 22. An orifice 24 of fixed size provides for discharge of the sample at a predetermined rate into the mixing receptacle 2. This rate is maintained constant by reason of the fact that the head on the orifice is held constant by reason of the overflow.

Regulated standard stock is introduced through line 26 and adjustable valve 27 to another chamber 28 provided with an overflow weir 30 and an orifice 32 from which discharge of the regulated stock takes place into the receptacle 2. In a typical operation, for example, this regulated stock may have a 4% consistency. It may be obtained from a later phase of a paper making operation where such a higher consistency is achieved and controlled. The overflows at 34 of the sampled stock and at 36 of the regulated stock may, of course, be returned to the system without loss. To give further typical figures of a practical operation, it may be assumed that the supply to receptacle 2 from orifice 24 is at the rate of 60 gallons per minute while that supplied from the orifice 32 is at a rate of 15 gallons per minute. By reason of the simple head-maintaining overflow arrangements the proportionality of the inflows to the receptacle 2 may be maintained to a high degree of accuracy. It will be evident, therefore, that measurement of the consistency of the mixed stock in the receptacle 2, knowing the consistency of that introduced at 26, makes possible the direct computation of the consistency of the sample.

The measurement of the consistency of the mixed stock is effected through the use of the type of apparatus described in said Head application. The receptacle 2 delivers its contents through the vertical pipe 38 which, consistent with the flow figures already given may have an internal diameter of 2.5 inches. This, with a total flow rate therethrough of 75 gallons per minute provides only a very short transfer time to the measuring apparatus which comprises the enlarged pipe 40 (for example having an internal diameter of six inches) which contains the float 42 comprising the vertically guided rod 46 (the guiding means not being shown) which carries the transverse fingers 44 in the form of cylindrical rods which are desirably disposed with adjacent ones at right angles to each other. The rod 46 engages the slack diaphragm of a transmitter 48, desirably of pneumatic type as shown in said Head application, though it will be evident that other transmitters may equally well be provided. The transmitter provides a pneumatic output pressure to be measured and recorded by the recorder controller 50 of conventional type which provides an output for the control of valve 12. The stock from the measuring device overflows at the weir 52 and may be removed from connection 54 for return to the process.

The control of the valve 12 regulates the supply of diluting water to the incoming stock at 8, thereby to maintain the diluted stock in the delivery connection 14 at a concentration which is desired and which may be adjusted by the conventional set point control of the transmitter 48. If, in a particular installation, the type of fibrous material which is used is essentially constant, the recorder 50 may be calibrated directly in terms of consistency of the stock flowing through connection 14. In other cases the readings recorded may be in some arbitrary unit which may be translated into consistency in accordance with empirical calibration.

It may be noted that linearity of response is not essential, though, as is usual, extreme non-linearity is not desirable because of the effect on accuracy at an end of the measuring range.

It is desirable to have the measurements made as soon as possible after taking of the sample so as to maintain good control, and for this reason it is desirable to keep small the temporary reservoir 20, the receptacle 2, and the connections to and through the measuring device.

The operation will be generally clear from the foregoing but may be briefly summarized to indicate the achievements of the objects of the invention. Proportionate amounts of the low consistency sample and of the standard higher consistency stock are thoroughly admixed in receptacle 2. Measurement of consistency of the mixture is made, and this measurement is accurate because the mixture has a consistency which is in the accurately measurable range. In effect the device for measurement and control detects changes in consistency of the mixture, and rectifies these changes by control of the consistency of the incoming stock at 8 by providing additional water thereto.

While the consistency measuring device is relatively insensitive to changes of flow rate, since relatively low consistencies are being measured even in the case of the mixture, it is desirable to maintain the flow rate through the measuring devices reasonably constant. This end is achieved by control of the flow rates at 24 and 32 not only to maintain proportioning but substantially constant total flow, the level of the slurry in receptacle 2 automatically adjusting itself to a corresponding height and thus providing constant flow.

It will be evident that various details of the apparatus used may be changed without departing from the scope of the invention as defined in the following claims.

What is claimed is:

1. In combination, a first bank having an outlet orifice and an overflow weir, means for feeding to said tank continuously a fibrous suspension of low consistency at a rate in excess of outflow through the orifice of said tank when overflow occurs over the weir thereof, a second tank having an outlet orifice and an overflow weir, means for feeding to said second tank continuously a similar fibrous suspension of known consistency greater than that of the first mentioned suspension at a rate in excess of outflow through the orifice of said second tank when overflow occurs over the weir thereof, a mixing receptacle receiving the outflows from the orifices of both of said tanks and means for measuring the consistency of the resulting mixture, the last mentioned means including means for maintaining substantially constant the flow of said mixture therethrough.

2. In combination, a first tank having an outlet orifice and an overflow weir, means for feeding to said tank continuously a fibrous suspension of low consistency at a rate in excess of outflow through the orifice of said tank when overflow occurs over the weir thereof, a second tank having an outlet orifice and an overflow weir, means for feeding to said second tank continuously a similar fibrous suspension of known consistency greater than that of the first mentioned suspension at a rate in excess of outflow through the orifice of said second tank when overflow occurs over the weir thereof, a mixing receptacle receiving the outflows from the orifices of both of said tanks, means for measuring the consistency of the resulting mixture, and means controlled by said measuring means for diluting the first mentioned fibrous suspension prior to entrance into the first mentioned tank to maintain substantially constant the consistency of the first mentioned suspension.

3. In combination, a first tank having an outlet orifice and an overflow weir, means for feeding to said tank continuously a fibrous suspension of low consistency at a rate in exces of outflow through the orifice of said tank when overflow occurs over the weir thereof, a second tank having an outlet orifice and an overflow weir, means for feeding to said second tank continuously a similar fibrous suspension of known consistency greater than that of the first mentioned suspension at a rate in excess of outflow through the orifice of said second tank when overflow occurs over the weir thereof, a mixing receptacle receiving the outflows from the orifices of both of said tanks, means for measuring the consistency of the resulting mixture, the last mentioned means including means for maintaing substantially constant flow of said mixture therethrough, and means controlled by said measuring means for diluting the first mentioned fibrous suspension prior to entrance into the first mentioned tank to maintain substantially constant the consistency of the first mentioned suspension.

4. The method comprising supplying to a mixing receptacle relatively proportioned flows of a fibrous suspension of low consistency and a similar fibrous suspension of known consistency greater than that of the first mentioned suspension, and measuring the consistency of the resulting mixture.

5. The method comprising supplying continuously to a mixing receptacle relatively proportioned flows of a fibrous suspension of low consistency and a similar fibrous suspension of known consistency greater than that of the first mentioned suspension, and measuring continuously the consistency of the resulting flowing mixture.

6. The method comprising supplying continuously to a mixing receptacle relatively proportioned flows of a fibrous suspension of low consistency and a similar fibrous suspension of known consistency greater than that of the first mentioned suspension, and measuring continuously the consistency of the resulting flowing mixture while maintaining substantially constant flow at the point of measurement.

7. The method comprising supplying continuously to a mixing receptacle relatively proportioned flows of a fibrous suspension of low consistency and a similar fibrous suspension of known consistency greater than that of the first mentioned suspension, measuring continuously the consistency of the resulting flowing mixture, and continuously diluting the first mentioned suspension to maintain its consistency substantially constant.

References Cited in the file of this patent

UNITED STATES PATENTS

| | | |
|---|---|---|
| 1,357,760 | Allen | Nov. 2, 1920 |
| 1,684,645 | Smith | Sept. 18, 1928 |
| 1,890,799 | Wells | Dec. 13, 1932 |
| 1,990,501 | Poiver | Feb. 12, 1935 |
| 2,171,312 | Meyers | Aug. 29, 1939 |
| 2,272,970 | Frymoyer | Feb. 10, 1942 |
| 2,607,718 | Suthard | Aug. 19, 1952 |
| 2,815,763 | Fanselow | Dec. 10, 1957 |
| 2,880,654 | Henry | Apr. 7, 1959 |